(12) United States Patent
Haque

(10) Patent No.: US 7,252,729 B2
(45) Date of Patent: Aug. 7, 2007

(54) POLYMER/WUCS MAT FOR USE IN SHEET MOLDING COMPOUNDS

(75) Inventor: Enamul Haque, Novi, MI (US)

(73) Assignee: Owens-Corning Fiberglas Technology Inc., Summit, IL (US)

( * ) Notice: Subject to any disclaimer, the term of this patent is extended or adjusted under 35 U.S.C. 154(b) by 300 days.

(21) Appl. No.: 11/024,548

(22) Filed: Dec. 29, 2004

(65) Prior Publication Data

US 2006/0137798 A1   Jun. 29, 2006

(51) Int. Cl.
*B27N 1/02* (2006.01)

(52) U.S. Cl. ............ 156/148; 156/181; 156/256; 156/296; 264/122; 162/156; 162/225

(58) Field of Classification Search ............ None
See application file for complete search history.

(56) References Cited

U.S. PATENT DOCUMENTS

| | | | |
|---|---|---|---|
| 3,881,222 A * | 5/1975 | Roberson | 19/66 R |
| 4,229,397 A | 10/1980 | Fukuta et al. | |
| 4,889,764 A | 12/1989 | Chenoweth et al. | |
| 4,946,738 A | 8/1990 | Chenoweth et al. | |
| 5,565,049 A | 10/1996 | Simmons et al. | |
| 5,571,610 A | 11/1996 | Loftus et al. | |
| 5,632,949 A | 5/1997 | Fisher et al. | |
| 5,721,177 A | 2/1998 | Frank | |
| 5,736,475 A | 4/1998 | Bakhshi et al. | |
| 6,159,882 A | 12/2000 | Kean et al. | |
| 2002/0160682 A1 | 10/2002 | Zeng et al. | |
| 2003/0060113 A1 | 3/2003 | Christie et al. | |
| 2003/0121989 A1 | 7/2003 | Michael | |
| 2003/0134556 A1 | 7/2003 | Christie et al. | |
| 2003/0176131 A1 | 9/2003 | Tilton | |
| 2003/0194933 A1 | 10/2003 | Patel | |
| 2004/0051212 A1 | 3/2004 | Michael | |
| 2004/0161993 A1 | 8/2004 | Tripp et al. | |
| 2004/0177911 A1 | 9/2004 | Dittmar | |
| 2004/0217507 A1 * | 11/2004 | Yang et al. | 264/129 |
| 2005/0115662 A1 | 6/2005 | Haque et al. | |

FOREIGN PATENT DOCUMENTS

| | | |
|---|---|---|
| EP | 0 297 500 | 1/1989 |
| FR | 2.073.334 | 10/1971 |
| WO | WO 02/26463 | 4/2002 |
| WO | WO 2005/037897 | 4/2005 |

* cited by examiner

*Primary Examiner*—Sam Chuan Yao
(74) *Attorney, Agent, or Firm*—Inger H. Eckert; Margaret S. Millikin

(57) ABSTRACT

A method of forming a molding mat formed bundles of reinforcing fibers and bonding materials is provided. The reinforcing fibers are preferably wet use chopped strand glass fibers (WUCS). The bonding materials may be any thermosetting material having a melting point less than the reinforcing fiber. The molding mat may be formed by partially opening the wet use chopped strand glass fibers and filamentizing the bonding materials, blending the reinforcement and bonding fibers, forming the reinforcement and bonding fibers into a sheet, and bonding the sheet. During bonding, the sheet is heated to a temperature above the melting point of the bonding fibers but below the temperature of the glass fibers. The molding mat thus formed may be used as a reinforcement material in sheet molding compounds.

6 Claims, 4 Drawing Sheets

POLYMER/WUCS MAT FOR USE IN SHEET MOLDING COMPOUNDS

TECHNICAL FIELD AND INDUSTRIAL APPLICABILITY OF THE INVENTION

The present invention relates generally to reinforced composite products, and more particularly, to a molding mat that is formed of bonding materials and bundles of reinforcing fibers and which can be used as a reinforcement material in sheet molding compounds.

BACKGROUND OF THE INVENTION

Glass fibers are useful in a variety of technologies. For example, glass fibers are used as reinforcements in polymer matrices to form glass fiber reinforced plastics or composites. Glass fibers have been used in the form of continuous or chopped filaments, strands, rovings, woven fabrics, non-woven fabrics, meshes, and scrims to reinforce polymers. Glass fibers are commonly used as reinforcements in polymer matrices to form glass fiber reinforced plastics or composites because they provide dimensional stability as they do not shrink or stretch in response to changing atmospheric conditions. In addition, glass fibers have high tensile strength, heat resistance, moisture resistance, and high thermal conductivity.

Typically, glass fibers are formed by attenuating streams of a molten glass material from a bushing or orifice. An aqueous sizing composition containing a film forming polymer, a coupling agent, and a lubricant is typically applied to the fibers after they are drawn from the bushing to protect the fibers from breakage during subsequent processing and to improve the compatibility of the fibers with the matrix resins that are to be reinforced. After the sizing composition has been applied, the sized fibers may be gathered into separate strands and wound to produce a glass fiber package. The glass fiber package may then be heated to remove water and deposit the size as a residue lightly coating the surface of the glass fiber. Multiple numbers of the resulting dried glass fiber packages may be consolidated and wound onto a spool referred to as a roving doff or package. The roving package is composed of a glass strand with multiple bundles of glass fibers.

Reinforcement rovings may be used in a sheet molding compound (SMC) process. In an exemplary conventional SMC production process, a layer of a first resin paste, such as an unsaturated polyester resin or vinyl ester resin premix, is metered onto a plastic carrier sheet that has a non-adhering surface. Chopped glass fiber roving bundles are then deposited onto the first layer of resin paste. A second layer of resin paste is also metered onto a plastic carrier sheet which is then placed on top of the chopped glass/first resin paste layer to form a sandwich material. The first and second layers of resin pastes typically contain a mixture of resins and additives such as fillers, pigments, UV stabilizers, catalysts, initiators, inhibitors, mold release agents, and/or thickeners. This sandwiched material may then be compacted to distribute the polymer resin matrix and glass fiber bundles throughout the resultant SMC material, which may then be rolled or laid in a box for later use in a molding process.

In the production of SMC compounds, it is desirable that the chopped glass fiber bundles contact the polymeric matrix material. One measure of this contact is referred to as wetting, which is a measure of how well the glass bundles are encapsulated by the matrix SMC resin material. It is desirable to have the glass bundles completely wet with no dry glass. Incomplete wetting during this initial processing can adversely affect subsequent processing of the SMC compound as well as affect the surface characteristics of the final composite product. For example, poor wetting may result in poor molding characteristics of the sheet molding compound, resulting in low composite strengths and surface defects in the final composite part. The SMC manufacturing process throughput, such as lines speeds and productivity, are limited by how well and how quickly the roving chopped bundles can be completely wet.

Another problem faced by manufacturers of SMC composite products is evenly distributing the chopped glass roving onto the resin paste. If a uniform distribution of glass fibers is not provided, the final composite product may possess undesirable properties. Another problem with conventional SMC processes that use chopped glass roving is that adding the chopped glass during the manufacturing process is slow and costly. In addition, loose glass has the potential to be skin irritating if the fibers come into contact with workers forming the SMC compound.

Therefore, there exists a need in the art for a non-woven mat for use as a reinforcement material in SMC composite products, that improves wetting and correspondingly the SMC production rate and physical properties of the composite product, has improved structural and thermal properties, and is inexpensive to manufacture.

SUMMARY OF THE INVENTION

It is an object of the present invention to provide a method of forming a molding mat that includes of bundles of reinforcing fibers and bonding fibers. In forming the molding mat, bales of wet reinforcing fibers are partially opened and at least partially dehydrated by removing water from the reinforcement fibers to from dehydrated reinforcement fiber bundles. The reinforcement fiber bundles are mixed with bonding fibers to form a substantially homogenous mixture of reinforcement fiber bundles and bonding fibers. In at least one exemplary embodiment, the bonding fibers are filamentized by an opening apparatus prior to mixing with the bundles of dehydrated reinforcement fibers. The mixture of reinforcement fiber bundles and bonding fibers is then formed into a sheet, such as by passing the mixture through a sheet former. Optionally, the sheet may be subjected to a needling process to mechanically bond the reinforcement fiber bundles and bonding fibers. The sheet may then be heated to a temperature above the melting point of the bonding fibers but below the melting point of the reinforcement fiber bundles to bond the bonding fibers and reinforcing fibers. A binder resin may be added to the sheet to assist in the bonding of the reinforcement fiber bundles and bonding fibers. The resulting molding mat may be used as a reinforcement in sheet molding compounds.

It is another object of the present invention to provide a molding mat that may be used as a reinforcement in sheet molding compounds. The molding mat is formed of a substantially uniform distribution of bundles of dehydrated wet reinforcement fibers and at least one bonding material. The wet reinforcement fibers may be organic, inorganic, or natural fibers that provide good structural and thermal properties. Preferably, the wet reinforcement fibers are wet use chopped strand glass fibers. The bonding material has a melting point lower than the reinforcing fibers. Suitable bonding materials include polyester resins, vinyl ester resins, phenolic resins, epoxies, polyamides and styrenes. The molding mat has a weight distribution of from 400-2000 $g/m^2$.

It is yet another object of the present invention to provide a method of forming a sheet molding compound material. A first thermosetting resin paste is deposited onto a first carrier film via a dispensing apparatus. A molding mat formed in accordance with the instant invention is fed from a roll and placed on the first resin paste. In at least one exemplary embodiment, a second thermosetting resin paste is deposited onto a second carrier film and is positioned on the molding mat layer such that the second thermosetting resin paste is positioned on the molding mat layer. The thus formed sandwiched material is composed of the first carrier film, the first thermosetting resin paste, the molding mat, the second thermosetting resin paste, and the second carrier film. In an alternate embodiment of the present invention, the second thermosetting resin paste is deposited onto the molding mat layer and the second carrier film is positioned on the second thermosetting resin paste. The sandwiched material is then passed through a series of belts to distribute the first and second thermosetting resin pastes and reinforcement fiber bundles in the molding mat and form a core layer composed of the mixture of the distributed thermosetting resin pastes and glass fiber bundles. The sheet molding compound (SMC) material that emerges from the belts may then be wound onto a take-up roll or placed in a box for later use.

It is an advantage of the present invention that the molding mat has a uniform or substantially uniform distribution of reinforcement fiber bundles and bonding fibers which provides improved strength, stiffness, impact resistance, and surface qualities.

It is also an advantage of the present invention that the inventive molding mats have a more uniform weight consistency and uniform properties compared to conventional chopped strand glass mats.

It is another advantage of the present invention that when wet use chopped strand glass fibers are used as the reinforcing fiber, the glass fibers may be easily opened with little generation of static electricity due to the moisture present in the glass fibers. In addition, wet use chopped strand glass fibers are less expensive to manufacture than dry chopped fibers because dry fibers are typically dried and packaged in separate steps before being chopped. Therefore, the use of wet use chopped strand glass fibers in forming the molding mat allows SMC composite products to be manufactured at lower costs.

The foregoing and other objects, features, and advantages of the invention will appear more fully hereinafter from a consideration of the detailed description that follows. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION AND PREFERRED EMBODIMENTS OF THE INVENTION

Figure 1:
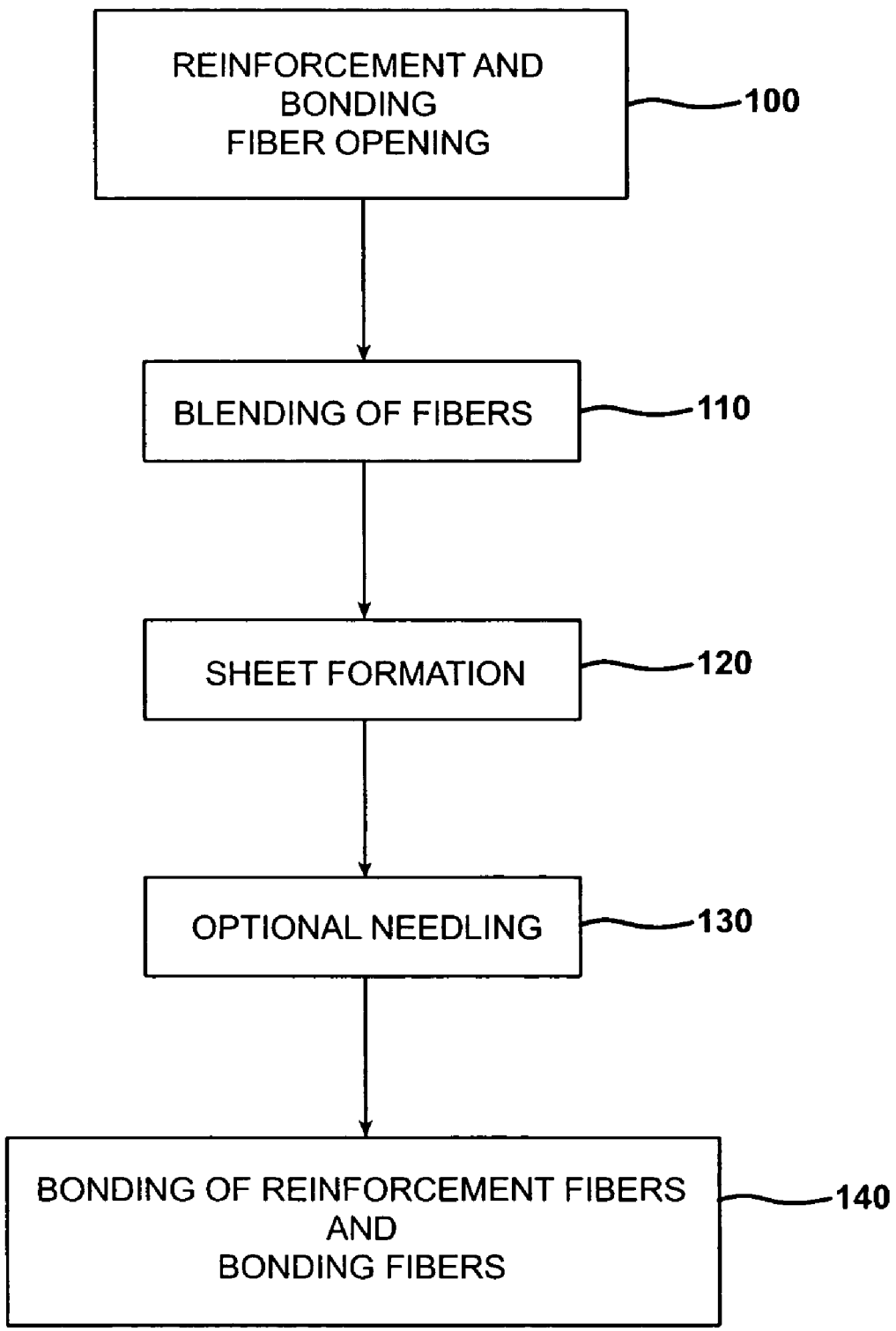
FIG. 1 is a flow diagram illustrating steps for using wet reinforcement fibers in a dry-laid process according to at least one aspect of the present invention.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, or any other references, are each incorporated by reference in their entireties, including all data, tables, figures, and text presented in the cited references.

In the drawings, the thickness of the lines, layers, and regions may be exaggerated for clarity. It is to be noted that like numbers found throughout the figures denote like elements. The terms "top", "bottom", "side", and the like are used herein for the purpose of explanation only. It will be understood that when an element such as a layer, region, or other material is referred to as being "on" another element, it can be directly on the other element or intervening elements may be present. If an element or layer is described as being "adjacent to" or "against" another element or layer, it is to be appreciated that element or layer may be directly adjacent to or directly against that other element or layer, or intervening elements may be present. It will also be understood that when an element or layer is referred to as being "over" another element, it can be directly over the other element, or intervening elements may be present. In addition, the terms "reinforcing fibers" and "reinforcement fibers" may be used interchangeably herein.

The invention relates to a molding mat formed of reinforcing fibers and bonding materials that can be used as a reinforcement in a sheet molding compound. The reinforcement fibers may be any type of fibers suitable for providing good structural qualities as well as good thermal properties. The reinforcing fibers may be any type of organic, inorganic, or natural fibers. Suitable examples of reinforcing fibers include glass fibers, wool glass fibers, natural fibers, metal fibers, ceramic fibers, mineral fibers, carbon fibers, graphite fibers, nylon fibers, rayon fibers, and polymer based thermoplastic materials such as, but not limited to, polyester fibers, polyethylene fibers, polypropylene fibers, polyethylene terephthalate (PET) fibers, polyphenylene sulfide (PPS) fibers, polyvinyl chloride (PVC) fibers, and ethylene vinyl acetate/vinyl chloride (EVA/VC) fibers, and mixtures thereof. The molding mat may be entirely formed of one type of reinforcement fiber (such natural fibers or glass fibers) or, alternatively, more than one type of reinforcement fiber may be used in forming the molding mat. The term "natural fiber" as used in conjunction with the present invention refers to plant fibers extracted from any part of a plant, including, but not limited to, the stem, seeds, leaves, roots, or bast. Preferably, the reinforcing fibers are glass fibers.

The reinforcing fibers may be chopped fibers having a discrete length of from approximately 11-75 mm in length, and preferably, a length of from 12-30 mm. Additionally, the reinforcing fibers may have diameters of from 8-35 microns, and preferably have diameters of from 12-23 microns. Further, the reinforcing fibers may have varying lengths (aspect ratios) and diameters from each other within the molding mat. The reinforcing fibers may be present in the molding mat in an amount of from 80-98% by weight of the total fibers, and are preferably present in the molding mat in an amount of from 85-95% by weight.

The bonding material may be any thermoplastic or thermosetting material having a melting point less than the reinforcing fibers. Non-limiting examples of thermoplastic and thermosetting materials suitable for use in the molding mat include polyester fibers, polyethylene fibers, polypropylene fibers, polyethylene terephthalate (PET) fibers, polyphenylene sulfide (PPS) fibers, polyvinyl chloride (PVC) fibers, ethylene vinyl acetate/vinyl chloride (EVA/VC) fibers, lower alkyl acrylate polymer fibers, acrylonitrile polymer fibers, partially hydrolyzed polyvinyl acetate fibers, polyvinyl alcohol fibers, polyvinyl pyrrolidone fibers, styrene acrylate fibers, polyolefins, polyamides, polysulfides, polycarbonates, rayon, nylon, phenolic resins, epoxy resins, and butadiene copolymers such as styrene/butadiene rubber (SBR) and butadiene/acrylonitrile rubber (NBR). It is desirable that one or more types of thermosetting materials be used to form the molding mat.

In addition, the bonding fibers may be functionalized with acidic groups, for example, by carboxylating with an acid such as a maleated acid or an acrylic acid, or the bonding fibers may be functionalized by adding an anhydride group or vinyl acetate. The bonding material may also be in the form of a flake, a granule, a resin, or a powder rather than in the form of a polymeric fiber.

The bonding material may also be in the form of multicomponent fibers such as bicomponent polymer fibers, tricomponent polymer fibers, or plastic-coated mineral fibers such as thermosetting coated glass fibers. The bicomponent fibers may be arranged in a sheath-core, side-by-side, islands-in-the-sea, or segmented-pie arrangement. Preferably, the bicomponent fibers are formed in a sheath-core arrangement in which the sheath is formed of first polymer fibers that substantially surround a core formed of second polymer fibers. It is not required that the sheath fibers totally surround the core fibers. The first polymer fibers have a melting point lower than the melting point of the second polymer fibers so that upon heating the bicomponent fibers to a temperature above the melting point of the first polymer fibers (sheath fibers) and below the melting point of the second polymer fibers (core fibers), the first polymer fibers will soften or melt while the second polymer fibers remain intact. This softening of the first polymer fibers (sheath fibers) will cause the first polymer fibers to become sticky and bond the first polymer fibers to themselves and other fibers that may be in close proximity.

Numerous combinations of materials can be used to make the bicomponent polymer fibers, such as, but not limited to, combinations using polyester, polypropylene, polysulfide, polyolefin, and polyethylene fibers. Specific polymer combinations for the bicomponent fibers include polyethylene terephthalate/polypropylene, polyethylene terephthalate/polyethylene, and polypropylene/polyethylene. Other non-limiting bicomponent fiber examples include copolyester polyethylene terephthalate /polyethylene terephthalate (co-PET/PET), poly 1,4 cyclohexanedimethyl terephthalate/polypropylene (PCT/PP), high density polyethylene/polyethylene terephthalate (HDPE/PET), high density polyethylene/polypropylene (HDPE/PP), linear low density polyethylene/polyethylene terephthalate (LLDPE/PET), nylon 6/nylon 6,6 (PA6/PA6,6), and glycol modified polyethylene terephthalate/polyethylene terephthalate (6PETg/PET).

The bicomponent polymer fibers may have a denier of from about 1-18denier and a length of from 2-4 mm. It is preferred that the first polymer fibers (sheath fibers) have a melting point within the range of from about 150-400° F., and even more preferably in the range of from about 170-300° F. The second polymer fibers (core fibers) have a higher melting point, preferably above about 350° F.

The bonding material may be present in the molding mat in an amount of from 2-20% by weight of the total fibers, and preferably from 2-10% by weight.

The molding mat may be formed by a dry-laid process, such as the dry-laid process described in U.S. patent application Ser. No. 10/688,013, filed on Oct. 17, 2003, to Enamul Haque entitled "Development Of Thermoplastic Composites Using Wet Use Chopped Strand Glass In A Dry Laid Process", which is incorporated by reference in its entirety. In preferred embodiments, the reinforcing fibers used to form the molding mat are wet reinforcing fibers, and most preferably are wet use chopped strand glass fibers. Wet use chopped strand glass fibers for use as the reinforcement fibers may be formed by conventional processes known in the art. It is desirable that the wet use chopped strand glass fibers have a moisture content of from 5-30%, and more preferably have a moisture content of from 5-15%.

The use of wet use chopped strand glass fibers provides a cost advantage over conventional dry-laid glass processes. For example, wet use chopped strand glass fibers are less expensive to manufacture than dry chopped fibers such as dry use chopped strand glass fibers (DUCS) because dry fibers are typically dried and packaged in separate steps before being chopped. As a result, the use of wet use chopped strand glass fibers allows the molding mat to be manufactured with lower costs.

An exemplary process for forming the molding mat is generally illustrated in FIG. 1, and includes partially opening the reinforcement fibers and bonding fibers (step 100), blending the reinforcement and bonding fibers (step 110), forming the reinforcement and bonding fibers into a sheet (step 120), optionally needling the sheet (step 130), and bonding the reinforcement and bonding fibers (step 140).

The reinforcing fibers and the fibers forming the bonding material are typically agglomerated in the form of a bale of individual fibers. Glass fibers are typically agglomerated in "boxes" of individual fibers. Bales of wet reinforcement fibers (e.g., boxes of wet use chopped strand glass fibers (WUCS)), may be easily opened with little generation of static electricity due to the moisture present in the glass fibers. In forming the molding mat, the bales of wet reinforcing fibers and bonding fibers are at least partially opened by an opening system, such as a bale opening system, common in the industry. The opening system serves to decouple the clustered fibers and enhance fiber-to-fiber contact.

Figure 2:
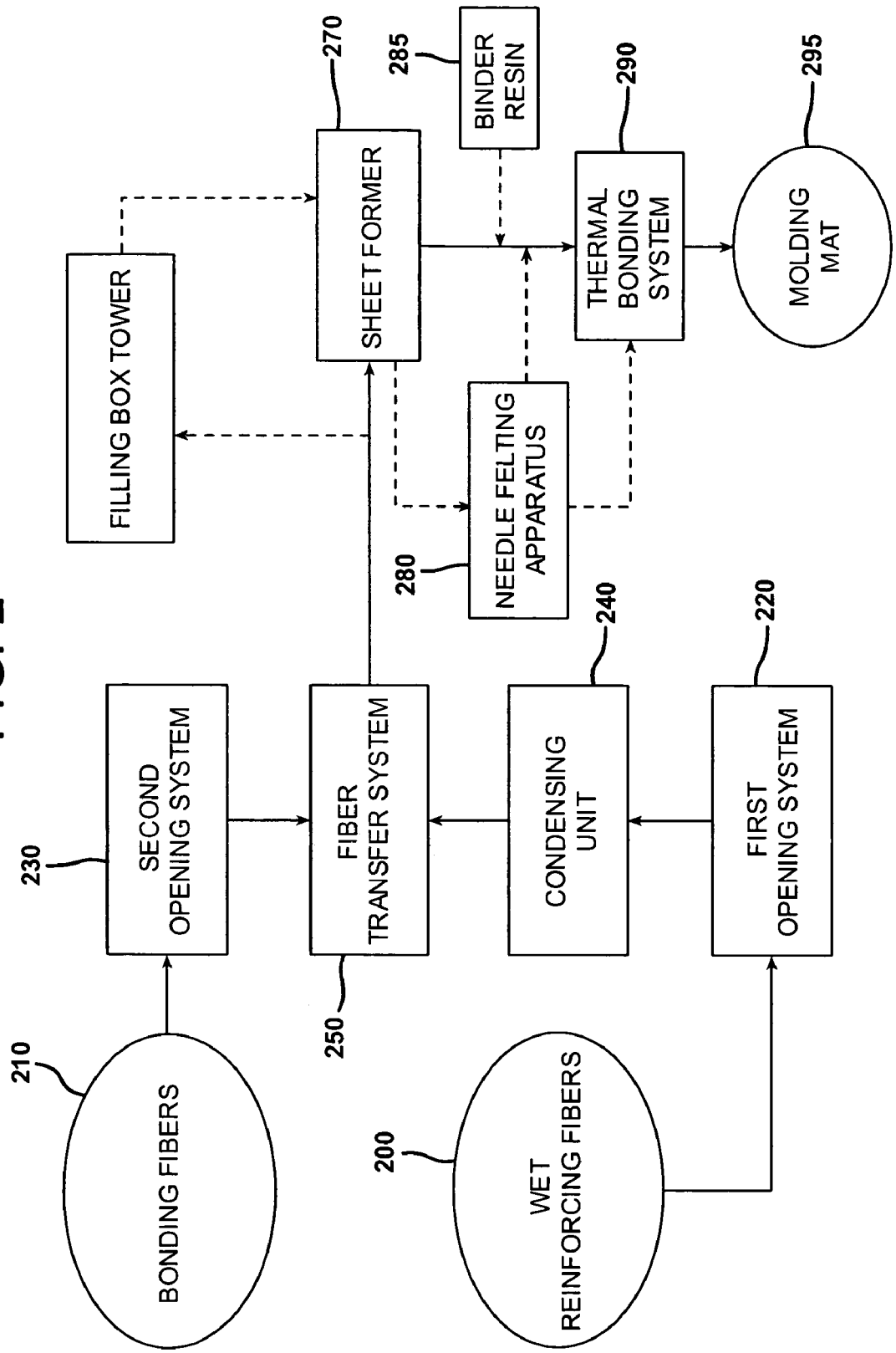
FIG. 2 is a schematic illustration of an air-laid process using wet reinforcement fibers to form a molding mat according to at least one exemplary embodiment of the present invention.

Turning to FIG. 2, the opening of the wet reinforcement fibers and the bonding fibers can best be seen. The wet reinforcing fibers 200 are fed into a first opening system 220 and the bonding fibers 210 are fed into a second opening system 230 to at least partially open the wet reinforcing fiber bales and bonding fiber bales respectively. It is desirable that the first opening system 220 partially open, but not filamentize, the bales of wet reinforcement fibers 200. It is to be noted that although the exemplary process depicted in FIGS. 1 and 2 show opening the bonding fibers 210 by a second opening system 230, the bonding fibers 210 may be fed directly into the fiber transfer system 250 if the bonding fibers 210 are present or obtained in a filamentized form (not shown), and not present or obtained in the form of a bale of fibers. Such an embodiment is considered to be within the purview of this invention.

The first and second opening systems 220, 230 are preferably bale openers, but may be any type of opener suitable for opening the bales of bonding fibers 210 and bales of wet reinforcing fibers 200. The design of the openers depends on the type and physical characteristics of the fiber being opened. Suitable openers for use in the present invention include any conventional standard type bale openers with or without a weighing device. The weighing device serves to continuously weigh the partially opened fibers as they are passed through the bale opener to monitor the amount of fibers that are passed onto the next processing step. The bale openers may be equipped with various fine openers, one or more licker-in drums or saw-tooth drums, feeding rollers, and/or or a combination of a feeding roller and a nose bar.

In alternate embodiments where the bonding material is in the form of a flake, granule, or powder (not shown), and not a bonding fiber, the second opening system 230 may be replaced with an apparatus suitable for distributing the powdered, flaked, or granule bonding material to the fiber transfer system 250 for mixing with the reinforcement fibers 200. A suitable apparatus would be easily identified by those of skill in the art. In embodiments where a resin in the form of a flake, granule, or powder is used in addition to the bonding fibers 210 (not shown), the apparatus for distributing the flakes, granules, or powder typically does not replace the second opening system 230. The flakes, granules, or powder may be fed directly into the fiber transfer system 250 for mixing with the reinforcement fiber bundles and bonding material.

The partially opened bales of wet reinforcement fibers 200 (reinforcement fiber bundles) may then be dosed or fed from the first opening system 220 to a condensing unit 240 to remove water from the wet fibers. In exemplary embodiments, greater than 70% of the free water (water that is external to the reinforcement fibers) is removed. Preferably, however, substantially all of the water is removed by the condensing unit 240. It should be noted that the phrase "substantially all of the water" as it is used herein is meant to denote that all or nearly all of the free water is removed. The condensing unit 240 may be any known drying or water removal device known in the art, such as, but not limited to, an air dryer, an oven, rollers, a suction pump, a heated drum dryer, an infrared heating source, a hot air blower, or a microwave emitting source.

The bundles of reinforcing fibers 200 and the bonding fibers 210 are blended together by the fiber transfer system 250. In preferred embodiments, the fibers are blended in a high velocity air stream. The fiber transfer system 250 serves both as a conduit to transport the bonding fibers 210 and bundles of reinforcing fibers 200 to the sheet former 270 and to substantially uniformly mix the fibers in the air stream. It is desirable to distribute the reinforcing fiber bundles 200 and bonding fibers 210 as uniformly as possible. The ratio of reinforcing fibers 200 and bonding fibers 210 entering the air stream in the fiber transfer system 250 may be controlled by weighing device such as described above with respect to the first and second opening systems 220, 230 or by the amount and/or speed at which the fibers are passed through the first and second opening systems 220, 230. In preferred embodiments, the ratio of reinforcing fibers 200 to bonding fibers 210 present in the air stream is 90:10, reinforcement fibers 200 to bonding fibers 210 respectively.

The mixture of reinforcing fibers 200 and bonding fibers 210 may be transferred by the air stream in the fiber transfer system 250 to a sheet former 270 where the fibers are formed into a sheet. One or more sheet formers may be utilized in forming the molding mat. In some embodiments of the present invention, the blended fibers are transported by the fiber transfer system 250 to a filling box tower 260 where the bundles of reinforcing fibers 200 and bonding fibers 210 are volumetrically fed into the sheet former 270, such as by a computer monitored electronic weighing apparatus, prior to entering the sheet former 270. The filling box tower 260 may be located internally in the sheet former 270 or it may be positioned external to the sheet former 270. The filling box tower 260 may also include baffles to further blend and mix the reinforcement fiber bundles 200 and bonding fibers 210 prior to entering the sheet former 270. In some embodiments, a sheet former 270 having a condenser and a distribution conveyor may be used to achieve a higher fiber feed into the filling box tower 260 and an increased volume of air through the filling box tower 260. In order to achieve an improved cross-distribution of the opened fibers, the distributor conveyor may run transversally to the direction of the sheet. As a result, the bonding fibers 210 and the bundles of reinforcing fibers 200 may be transferred into the filling box tower 260 with little or no pressure and minimal fiber breakage.

The sheet formed by the sheet former 270 contains a uniform or substantially uniform distribution of bundles of reinforcing fibers 200 and bonding fibers 210 at a desired ratio and weight distribution. In particular, the sheet formed by the sheet former 270 may have a weight distribution of from 400-2000 g/m$^2$, with a preferred weight distribution of from about 400-1000 g/m$^2$.

In one or more embodiments of the invention, the sheet exiting the sheet former 270 is subjected to a needling process in a needle felting apparatus 280 in which barbed or forked needles are pushed in a downward and/or upward motion through the fibers of the sheet to entangle or intertwine the reinforcing fibers 200 and bonding fibers 210 and impart mechanical strength and integrity to the mat. The needle felting apparatus 280 may include a web feeding mechanism, a needle beam with a needleboard, barbed felting needles ranging in number from about 500 per meter to about 7,500 per meter of machine width, a stripper plate, a bed plate, and a take-up mechanism. Mechanical interlocking of the reinforcement fibers 200 and bonding fibers 210 is achieved by passing the barbed felting needles repeatedly into and out of the sheet. An optimal needle selection for use with the particular reinforcement fiber and polymer fiber chosen for use in the inventive process would be easily identified by one of skill in the art.

Although the bonding fibers 210 are used to bond the reinforcing fibers 200 to each other, a binder resin 285 may be added as a bonding agent prior to passing the sheet through the thermal bonding system 290. The binder resin 285 may be in the form of a resin powder, flake, granule, foam, or liquid spray. The binder resin 285 may be added by any suitable manner, such as, for example, a flood and extract method or by spraying the binder resin 285 on the sheet. The amount of binder resin 285 added to the sheet may be varied depending of the desired characteristics of the molding mat. A catalyst such as ammonium chloride, p-toluene, sulfonic acid, aluminum sulfate, ammonium phosphate, or zinc nitrate may be used to improve the rate of curing and the quality of the cured binder resin 285.

Another process that may be employed to further bond the reinforcing fibers 200 either alone, or in addition to, the other bonding methods described herein, is latex bonding. In latex bonding, polymers formed from monomers such as ethylene ($T_g$ –125° C.), butadiene ($T_g$ –78° C.), butyl acrylate ($T_g$ –52° C.), ethyl acrylate ($T_g$ –22° C.), vinyl acetate ($T_g$ 30° C.), vinyl chloride ($T_g$ 80° C.), methyl methacrylate ($T_g$ 105° C.), styrene ($T_g$ 105° C.), and acrylonitrile ($T_g$ 130° C.) are used as bonding agents. A lower glass transition temperature ($T_g$) results in a softer polymer. Latex polymers may be added as a spray prior to the sheet entering the thermal bonding system 290. Once the sheet enters the thermal bonding system 290, the latex polymers melt and bond the reinforcement fibers 200 together.

A further optional bonding process that may be used alone, or in combination with the other bonding processes described herein is chemical bonding. Liquid based bonding agents, powdered adhesives, foams, and, in some instances, organic solvents can be used as the chemical bonding agent. Suitable examples of chemical bonding agents include, but are not limited to, acrylate polymers and copolymers, styrene-butadiene copolymers, vinyl acetate ethylene copolymers, and combinations thereof. For example, polyvinyl acetate (PVA), ethylene vinyl acetate/vinyl chloride (EVA/VC), lower alkyl acrylate polymer, styrene-butadiene rubber, acrylonitrile polymer, polyurethane, epoxy resins, polyvinyl chloride, polyvinylidene chloride, and copolymers of vinylidene chloride with other monomers, partially hydrolyzed polyvinyl acetate, polyvinyl alcohol, polyvinyl pyrrolidone, polyester resins, vinyl ester resins, phenolic resins, and styrene acrylate may be used as a chemical bonding agent. The chemical bonding agent may be applied uniformly by impregnating, coating, or spraying the sheet.

Either after the sheet exits the sheet former 270 or after the optional needling of the sheet, the sheet may be passed through a thermal bonding system 290 to bond the reinforcement fibers 200 and bonding fibers 210 and form the molding mat 295. However, it is to be appreciated that if the sheet is needled in the needle felting apparatus 280 and the reinforcing fibers 200 and the bonding fibers 210 are mechanically bonded, the sheet may not need to be passed through the thermal bonding system 290 to form the molding mat 295.

In the thermal bonding system 290, the sheet is heated to a temperature that is above the melting point of the bonding fibers 210 but below the melting point of the reinforcement fibers 200. When bicomponent fibers are used as the bonding fibers 210, the temperature in the thermal bonding system 290 is raised to a temperature that is above the melting temperature of the sheath fibers, but below the melting temperature of the reinforcement fibers 200. Heating the bonding fibers 210 to a temperature above their melting point(s), or the melting point of the sheath fibers in the instance where the bonding fibers 210 are bicomponent fibers, causes the bonding fibers 210 to become adhesive and bond the bonding fibers 210 both to themselves and to the reinforcing fibers 200. The melted bonding fibers 210 act as a glue to hold the dispersed glass fibers in bundles. If the bonding fibers 210 completely melt, the melted fibers may encapsulate the reinforcement fibers 200. As long as the temperature within the thermal bonding system 290 is not raised as high as the melting point of the reinforcing fibers and/or core fibers, these fibers will remain in a fibrous form within the thermal bonding system 290 and molding mat 295.

The thermal bonding system 290 may include any known heating and/or bonding method known in the art, such as oven bonding, oven bonding using forced air, infrared heating, hot calendaring, belt calendaring, ultrasonic bonding, microwave heating, and heated drums. Optionally, two or more of these bonding methods may be used in combination to bond the reinforcing fibers 200 and bonding fibers 210. The temperature of the thermal bonding system 290 varies depending on the melting point of the particular bonding fibers 210, binder resins, and/or latex polymers used, and whether or not bicomponent fibers are present in the sheet. The molding mat 295 that emerges from the thermal bonding system 290 contains dispersed bonding fibers and reinforcement fibers in bundles. When wet use chopped strand glass is used as the wet reinforcing fibers 200, the molding mat 295 that emerges from the thermal bonding system 290 contains uniformly or nearly uniformly dispersed bonding fibers 210 and glass filaments in bundles. The uniform or nearly uniform distribution of reinforcement fiber bundles 200 and bonding fibers 210 in the molding mat 295 provides improved strength, improved thermal properties, improved stiffness, and improved impact resistance to the final composite product. In addition, the molding mat 295 has a more uniform weight consistency compared to conventional chopped strand glass mats. Uniform weight consistency in the inventive molding mats results in uniform properties such as flexural and impact strength in the final products. In the molding mat of the present invention, the glass content variability is approximately +/−1.5% and the weight consistency is approximately +/−5%. Further, the uniform properties of the inventive molding mat permits the use of lower weight reinforcements than traditional chopped strand glass mats.

The molding mat 295 provides the ability to optimize and/or tailor the physical properties (such as stiffness or strength) needed for specific applications by altering the weight, length, and/or diameter of the reinforcement fibers and/or bonding fibers used in forming the molding mat. In addition, the sizing chemistry of the reinforcement fibers may be easily adapted to match the properties of individual types of bonding fibers. As a result, a large variety of molding mats and composite products formed using the molding mats, such as products formed from sheet molding compounds, can be made.

In an alternate embodiment (not illustrated), the molding mat is formed by a wet-laid process. For example, reinforcing fibers and bonding fibers are dispersed in an aqueous solution that contains a binder as well as dispersants, viscosity modifiers, defoaming agents, and/or other chemical agents and agitated to form a slurry. The bonding fibers and reinforcing fibers located in the slurry are then deposited onto a moving screen where water is removed. Optionally, the mat is dried in an oven. The mat may then be immersed in a binder composition to impregnate the mat with the binder composition. The mat is then passed through a curing oven to remove any remaining water, cure the binder, and at least partially melt the bonding fibers to bind the reinforcing fibers and bonding fibers together. The resulting molding mat is an assembly of dispersed bonding fibers and glass filaments in bundles.

Figure 3:
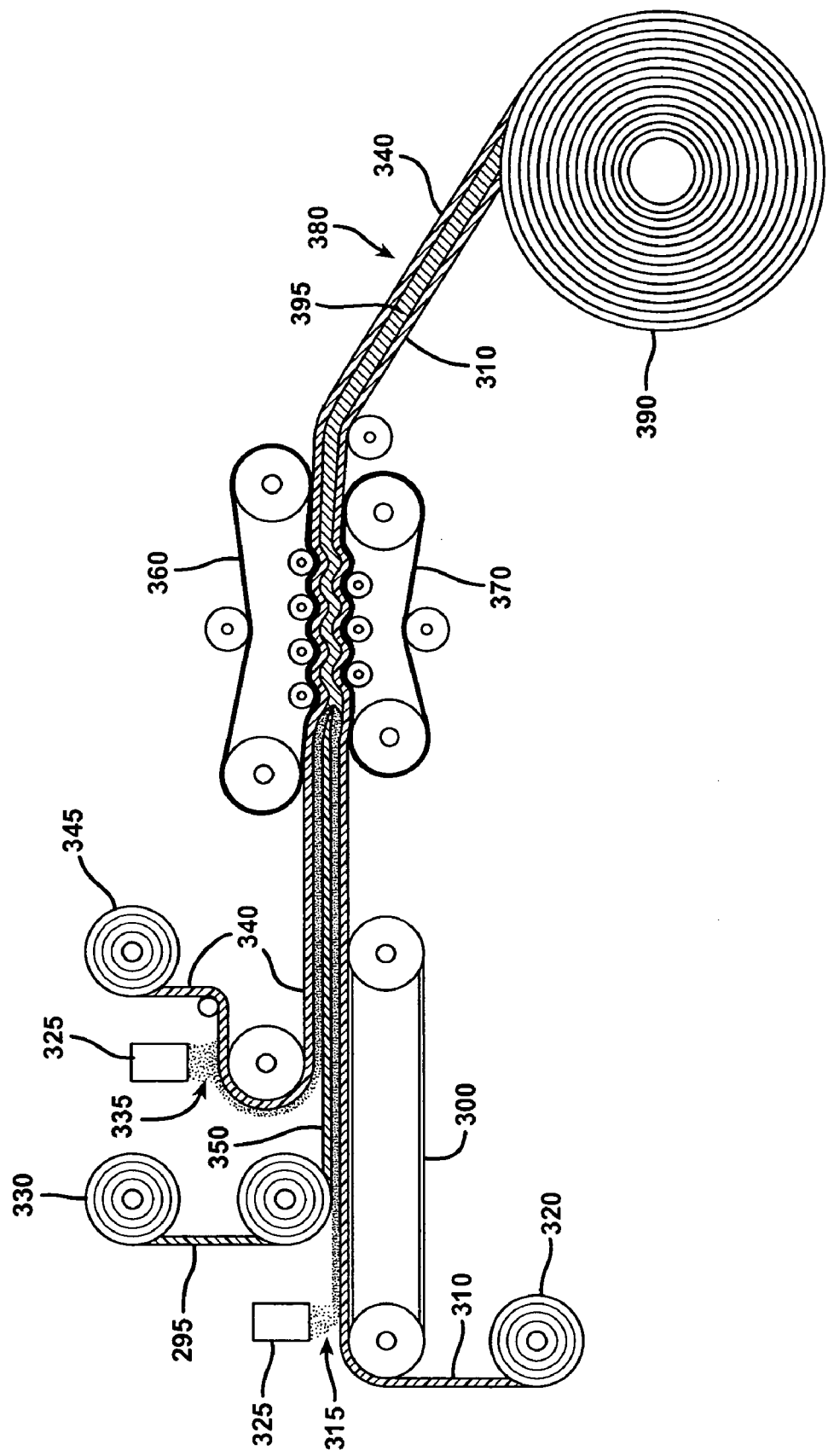
FIG. 3 is a schematic illustration of a sheet molding compound process utilizing a molding mat formed from wet use chopped strand glass fibers according to at least one exemplary embodiment of the present invention.

In at least one exemplary embodiment of the invention, the molding mat 295 is utilized in a sheet molding compound (SMC) process. One example of a sheet molding compound process that incorporates the molding mat of the present invention is illustrated in FIG. 3. A first carrier film 310 is fed from a first carrier roll 320 onto a moving conveyor belt 300. A first thermosetting resin paste 315 is applied to the first carrier film 310 via a dispensing apparatus 325. A molding mat 295 formed in accordance with the present invention is then fed from a roll 330 onto the first thermosetting resin paste 315 on the first carrier film 310. A second thermosetting resin paste 335 is deposited onto a second carrier film 340 fed from a second carrier roll 345 and is positioned on the molding mat layer 350 such that the second thermosetting resin paste 335 on the second carrier film 340 contacts the molding mat layer 350 and forms a sandwiched material that includes the first carrier film 310, the first thermosetting resin paste 315, the molding mat 295, the second thermosetting resin paste 335, and the second carrier film 340. In an alternative embodiment (not shown), the second thermosetting resin paste 335 may be deposited onto the molding mat layer 350 and the second carrier film 340 may be positioned on the second thermosetting resin paste 335.

The first and second thermosetting resin pastes, 315, 335 may be formed by mixing one or more suitable thermosetting materials, such as polyester resins, vinyl ester resins, phenolic resins, epoxies, polyimides, and/or styrenes, and any desired additives such as fillers, pigments, UV stabilizers, catalysts, initiators, inhibitors, mold release agents, thickeners, and the like. It is preferred that a filler be mixed with the thermosetting material in forming the thermosetting resin pastes 315, 335. Suitable examples of fillers include calcium carbonate, alumina trihydrate, mica, talc, glass bubbles, and woolastonite. However, adding a filler to the dispensing apparatus 325 along with the first and second thermosetting resin pastes 315, 335 is also considered to be within the purview of the invention. The first and second thermosetting resin pastes 315, 335 can be made at the same time in a mixing tank. It is also preferred that the thermosetting resin pastes 315, 335 include a thickening agent such as magnesium oxide, magnesium hydroxide, and/or calcium oxide. The thickener (or thickening agent paste) is added to the thermosetting resin pastes immediately, or nearly immediately, prior to transporting the thermosetting resin pastes 315, 335 to the dispensing apparatuses. The first and second thermosetting resin pastes 315, 335 may be compounded using the same resins. Non-limiting examples of materials used for the first and second carrier films 310, 340 include polymeric films such as polyethylene and nylon.

The sandwiched material is then passed through a series of belts 360, 370 where the sandwiched material is compacted to distribute the first and second thermosetting resin pastes 315, 335 and reinforcement fiber bundles in the molding mat 295 and form an intermediate layer 395 formed of the mixture of the distributed thermosetting resin pastes 315, 335 in the molding mat 295. The belts are preferably wire mesh belts to improve wet out of the reinforcement fibers by the first and second resin pastes 315, 335. Because the reinforcement fibers in the molding mat 295 are not filamentized and are present as bundles of fibers, they have the ability to wet with the thermosetting resin pastes and fillers in the sandwiched material. If the reinforcing fibers do not wet the bonding component(s) of the sheet molding compound, there may be poor mechanical performance of the final composite product and/or reduced porosity in the composite product. The resultant sheet molding compound (SMC) material 380 that emerges from the belts 360, 370 may then be wound onto a take up roll 390 as illustrated in FIG. 3 or placed in boxes (not shown) for later use.

Figure 4:
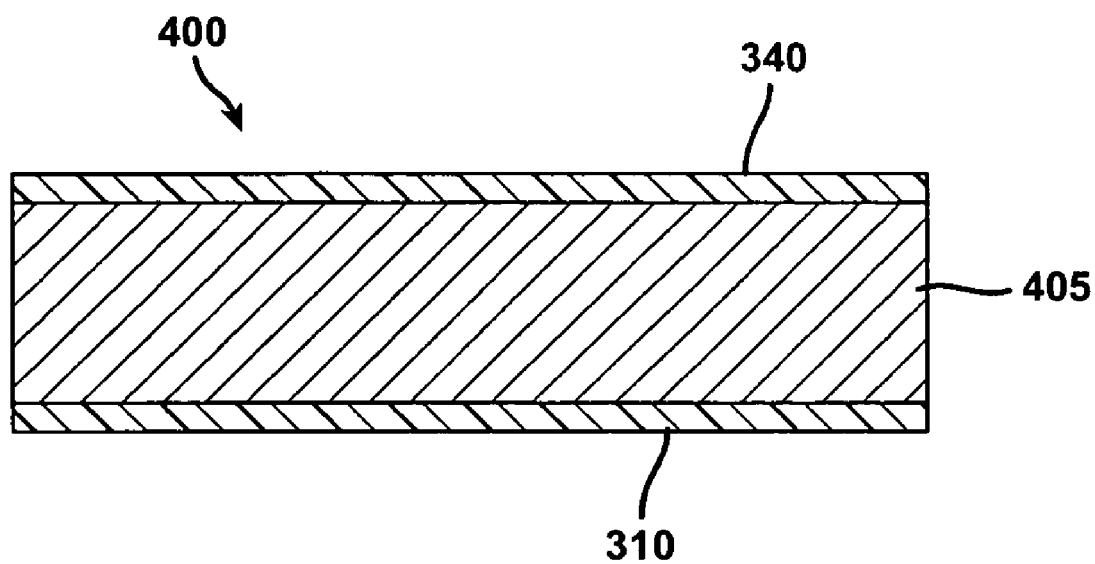
FIG. 4 is a schematic illustration of a matured sheet molding compound material according to at least one exemplary embodiment of the present invention.

The SMC material 380 may then be stored at a substantially constant temperature for 2-5 days to mature. During this maturation time, the SMC material 290 increases in viscosity to approximately 15-40 million centipoise. As the viscosity increases, the first and second resin pastes and the glass fiber bundles in the molding mat in the intermediate layer form an integral composite layer. A schematic depiction of the matured SMC material may be seen in FIG. 4. In particular, the matured SMC material 400 includes an integral composite layer 405 sandwiched between the first carrier film 310 and the second carrier film 340.

The matured SMC material 400 may be molded in a subsequent molding process to form the final composite product. For example, the matured SMC material 400 can be used in a matched die molding process (not illustrated). In this molding process, the first and second carrier films 310, 340 are removed from the matured SMC material 400 and the matured SMC material 400 is cut into pieces having a pre-determined size (charge). Pieces of the matured SMC material 400 are placed into a mold having a female and a male half, the halves of the mold are closed, and heat and pressure are applied to compress the charge, cure the thermosetting resins, and form the matured SMC material 400 into the pre-determined shape.

Once the molding cycle is complete, the mold is opened and the composite product is removed. The pressure within the mold may range from 200-1500 psi, preferably from 200-1200 psi, and the temperature within the mold may range from 100-170° C., preferably from 140-160° C. The molding cycle for the SMC material may be from 0.5-3.0 minutes, depending on the specific thermosetting resin used and the thickness of the final composite part. In addition to matched metal die molding (compression molding), the matured SMC material 400 may also be used in vacuum and pressure bagging, cold press molding, injection molding, and centrifugal casting to form composite products It should be appreciated that although the above-described process for forming the sheet molding material and molding it into a composite product has been described in what is believed to be the preferred embodiment, other variations and alternatives to the process identifiable to those of skill in the art are also considered to be within the purview of the invention.

The molding mat 295 provides improved flow and conformability of the SMC material 380 to the shape of the mold. Also, molding mats according to the instant invention provide improved molding capability by increasing the draw ratio and are thus able to conform to the shape of the mold and provide uniform properties to the composite product.

The SMC material 380 may be used to form a variety of composite products in numerous applications, such as in automotive applications including the formation of door panels, trim panels, exterior body panels, load floors, bumper, front ends, underbody shields, running boards, sunshades, instrument panel structures, door inners, etc. The SMC material 380 is particularly advantageous in automotive applications because the sheet molding compound material 380 offers a weight reduction in the formed composite part, corrosion resistance to the formed part, resistance to minor impacts, part consolidation, and improved surface quality, especially when compared to steel formed parts. Because the molding mat 295 of the present invention includes polymer fibers, the SMC material 380 has the advantage of improved elongation characteristics and reduced micro-cracking in the composite part. The use of polymer fibers having high elongation characteristics, such as polyethylene terephthalate (PET) fibers, further reduces the generation of micro-cracks in the composite parts formed from the SMC material 380. Further advantages of the SMC material 380 include a shorter tooling lead time and lower tooling cost to form the product. Other applications for the SMC material 380 include furniture applications (chairs, tabletops, etc.), household appliances (washing machine doors, refrigerator housings, etc.), business machines (computer housings), jet ski bodies, office screens and partitions, ceiling tiles, building panels, satellite dishes, electrical boxes, and man-hole covers.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. A method of making a molding mat for use as a reinforcement in a sheet molding compound comprising the steps of:
    at least partially opening bales of agglomerated wet reinforcement fibers and forming bundles of wet reinforcement fibers;
    removing water from said bundles of wet reinforcement fibers to form dehydrated reinforcement fiber bundles;
    mixing said dehydrated reinforcement fiber bundles with bonding fibers to form a substantially uniform mixture of said dehydrated reinforcement fiber bundles and bonding fibers;
    forming said mixture of dehydrated reinforcement fiber bundles and bonding fibers into a sheet; and
    bonding said dehydrated reinforcement fiber bundles and bonding fibers to form a molding mat.

2. The method of claim 1, wherein said wet reinforcement fibers are wet use chopped strand glass fibers.

3. The method of claim 2, further comprising the step of:
    adding a bonding agent to said sheet prior to said bonding step, said bonding agent being selected from the group consisting of resin powders, resin flakes, latex polymers, resin granules, adhesive foams and organic solvents.

4. The method of claim 2, further comprising the step of:
    needling said sheet prior to said bonding step to mechanically bond said dehydrated reinforcement fiber bundles and said bonding fibers prior to said bonding step.

5. The method of claim 2, further comprising the step of:
    transporting said mixture of said dehydrated reinforcement fiber bundles and said bonding fibers to a filling box tower prior to said forming step, said filling box tower volumetrically feeding said mixture to said sheet former.

6. The method of claim 2, wherein said bonding step comprises:
    heating said sheet to a temperature above the melting point of said bonding fibers and below the melting point of said dehydrated reinforcement fiber bundles to at least partially melt said bonding fibers and bond at least a portion of said dehydrated reinforcement fiber bundles and said bonding fibers.

* * * * *